United States Patent [19]

Ooi

[11] Patent Number: 5,555,511
[45] Date of Patent: Sep. 10, 1996

[54] DATA PROCESSING SYSTEM FOR PICTURE CODING PROCESSING

[75] Inventor: Yasushi Ooi, Tokyo, Japan

[73] Assignee: NEC Corporation, Tokyo, Japan

[21] Appl. No.: 330,550

[22] Filed: Oct. 28, 1994

[30]     Foreign Application Priority Data

Oct. 28, 1993  [JP]  Japan .................................. 5-270717

[51] Int. Cl.$^6$ ....................................................... H04J 3/22
[52] U.S. Cl. ................. 364/514 R; 395/114; 365/230.05
[58] Field of Search .............................. 364/725, 514 R, 364/715.02; 358/433; 382/56; 365/230.05; 395/114, 425

[56]           References Cited

U.S. PATENT DOCUMENTS

| 4,823,201 | 4/1989 | Simon et al. . | |
|---|---|---|---|
| 5,191,548 | 3/1993 | Balkanski et al. | 364/725 |
| 5,196,946 | 3/1993 | Balkanski et al. | 358/433 |
| 5,341,318 | 8/1994 | Balkanski et al. | 364/725 |

FOREIGN PATENT DOCUMENTS

| 443114A2 | 8/1991 | European Pat. Off. . |
|---|---|---|
| 469855A2 | 2/1992 | European Pat. Off. . |
| 5966747 | 4/1984 | Japan . |
| 1026988 | 1/1989 | Japan . |
| 4196695 | 7/1992 | Japan . |
| 4220081 | 8/1992 | Japan . |

OTHER PUBLICATIONS

"Multimedia International Standardized System 'MPEG' Fixed, Moving Picture Compression/Expansion Chip Appears"; Nikkei Electronics No. 544, pp. 147–154, Jan. 6, 1992.

Tsugio Noda, et al. "A JPEG Still Picture Compression LSI", 1991 Symposium on VLSI Circuits, Digest of Technical Papers, IEEE Cat No. 91 CH 3018-9, May. 30 Jun. 1, 1991, pp. 33–34.

*Primary Examiner*—Emanuel T. Voeltz
*Assistant Examiner*—Thomas Peeso
*Attorney, Agent, or Firm*—Whitham, Curtis, Whitham & McGinn

[57]              ABSTRACT

A data processing system for a picture coding, includes a data memory for storing a discrete cosine transform (DCT) coefficient data successively transferred one after another, a flipflop set prior to the successive transfer of the DCT coefficient data, and a non-zero detector for detecting a non-zero data when the DCT coefficient data is successively transferred. When the non-zero data is detected, the non-zero detector resets the flipflop. When the successive transfer of the DCT coefficient data has been completed, an entropy coding central processing unit (CPU) discriminates on the basis of the condition of the flipflop whether or not all of the data stored in the data memory is zero, so that if the condition of the flipflop indicates that all of the data stored in the data memory is zero, the entropy coding CPU does not read the data memory.

20 Claims, 7 Drawing Sheets

RASTER SCAN ORDER

ZIGZAG SCAN ORDER

DATA PROCESSING SYSTEM FOR PICTURE CODING PROCESSING

BACKGROUND OF THE INVENTION

1. Field of the Invention

The present invention relates to a data processing system, and more specifically to a data input processing for a picture coding processing in a data processing system.

2. Description of Related Art

A high performance picture coding processing (data compression of picture information) is being standardized in a plurality of organizations so as to ensure compatibility of compressed data in various applications. In the field of communication, the CCITT (International Telegraph and Telephone Consultative Committee) recommendations H.261 and an MPEG (Moving Picture Coding Experts Group) format in the ISO (International Organization of Standardization) for a package system (for example, CD-ROM (compact disc read only memory)), are important in standardizing a moving picture coding.

A picture coding processing, which is now being standardized, is realized by a combination of a plurality of unitary processing algorithms as shown in FIG. 1. In the shown processing, a main processing is constituted of a movement prediction processing 101, a frame difference processing 102, a DCT (discrete cosine transform) processing 103, a quantization processing 104, a zigzag scanning and zero detection 105, and an entropy coding processing 106. In addition, to complete the predicted picture at the coding side, a reverse-quantization processing 107, a reverse-DCT processing 108 and a frame accelerating processing 109 are performed. The result thus obtained is stored in a frame memory 110, which is fed back to a succeeding prediction processing 101.

Most of the above mentioned processings are executed for each one of a plurality regions obtained by dividing a whole of the picture into a meshed form. These processings include a processing performed in units of an 8×8 pixel region (called a "block") (for example, DCT processing 103) and another processing performed in units of 16×16 pixel region (called a "macro-block") (for example, movement prediction processing 101). In this connection, it is defined that, in a macro-block layer, a brightness signal Y is composed of information of 16×16 pixels, and color difference signals Cb and Cr are treated as information of 8×8 pixels obtained by cutting a vertical direction in half. Therefore, the macro-block includes four blocks of brightness signals and one block for each of two color difference signals, and accordingly, have information of six blocks in total.

The coding processing, only a portion to which the present invention is directed, will be further described in detail. The zigzag scan and zero detection processing 105 is performed after the DCT processing 103 and the quantization processing 104. Here, the zigzag scanning is to scan from a low frequency side to a high frequency side in both vertical and horizontal spatial frequency components (See FIG. 6). According to viewing characteristics of a picture, even if the DCT coefficient precision is made low for a high frequency region, it insensitive to distortion in a restored picture, and therefore, the quantization processing is made in such a manner that the higher the frequency component becomes, the rougher the quantization becomes. As a result, a zero value is apt to appear in a high frequency component in the DCT coefficients after quantization. Therefore, the zigzag scanning is used, since at the time of a zero-run length coding in an in-block coding, to gather the zero components distributed in the high frequency region is effective in elevating the coding efficiency (compression ratio).

In the picture coding of H.261 and MPEG, furthermore, the conception of the zero run length is adopted not only in the in-block coding but also in the macro-block layer. Namely, information as to which of the blocks in the macro-block has all zero DCT coefficients, or information as to how many the macro-blocks having all zero DCT coefficients continue, are encoded so as to elevate the compression ratio.

The former is coded in a field named a "CBP" (Coded Block Pattern) in the macro-block layer, for the purpose of indicating which of the six blocks has all zero DCT coefficients. The latter is coded in a field named a "MBA" (Macro Block Address), indicative of the number of the macro-blocks which were skipped because of all zero DCT coefficients.

As seen from the above, in order to realize the coding standard of MPEG and H.261, the CBP coding and the MBA coding based on the zero detection after the zigzag scanning are necessary.

On the other hand, the processing illustrated in FIG. 1 is required to be executed in real time since the moving picture is processed. For example, if a picture composed of 360 pixels in a horizontal direction and 240 pixels in a vertical direction is processed at a rate of 30 frames per second, a processing period for each one image is 33.3 ms, and a processing period for each one micro-block is about 100 μs. In other words, if an operating frequency of a processing device is on the order of megahertz (MHz), a 100 system clocks are required to be allocated for the processing for each one micro-block. In a processing device having a 50 MHz operation (cycle time of 0.02 μs), if each one macro-block processing is completed with 5000 clocks, the real time processing can be ensured.

Under current digital electronics technology, the picture coding processing requires an extremely high performance processing device. It is necessary to maintain the processing performance on the order of 500 to 1000 MOPS (million operations per second) on average. A current RISC (reduced instruction set computer) CPU (central processing unit) chip is on the order of 50 to 100 MIPS (million instructions per second). The picture coding processing requires a performance which is ten times that of the current RISC CPU chip.

In order to realize the above mentioned high performance, two approaches have been adopted. The first approach is to use a high speed parallel-processing DSP (digital signal processor) so that most of the necessary processings are executed by a DSP program. The second approach is to couple together a plurality of specialized processors so that most of the necessary processings are executed by specialized hardware.

In the first approach using the high speed parallel-processing DSP, an operation unit is typically added for a heavy load processing in order to elevate the processing performance. One example is shown in U.S. Pat. No. 4,823,201 to Simon et al. Referring to FIG. 2 showing a system disclosed in FIG. 2 of U.S. Pat. No. 4,823,201, a micro sequencer 226 control, in parallel, a data path 242, an ALU (arithmetic and logic unit) 244, a pixel interpolator 246, an entropy decoder 230, two input/output FIFOs (first-in first-out memory) 232 and 234, and an output FIFO 236, by use of a relatively long instruction word of 48 bits. Among these functional units, the pixel interpolator 246 and the entropy decoder 230 can be considered to correspond to the operation unit added for the heavy load processing.

In the Second approach using the specialized processors, on the other hand, specialized operation units are used for a heavy load processing such as the movement predicting processing 101 and the DCT processing 103, for the purpose of speeding up the processing. One example is shown in "Multimedia International standardized System 'MPEG' Fixed, Moving Picture Compression/Expansion Chip Appears", NIKKEI ELECTRONICS No.554, pp147–154, Jan. 6, 1992.

In the disclosed approach using the specialized processors, however, a hardware for the block skip discrimination in the CBP coding and the MBA coding is not disclosed, although consideration was made on the operation units for a heavy load processing such as the movement predicting processing 101 and the like.

In the case of using a general-purpose processor, a zero block discrimination would be realized by an instruction sequence, in which data is read out from a memory, and then, a test instruction is executed by an ALU, and on the basis of the result of the execution, a condition for a conditional branch is discriminated.

Furthermore, when either a multiplier or a multiplicand is zero, an answer is also zero, and therefore, it is not necessary to actually perform the multiplication processing. Japanese Patent Application Laid-open Publication JP-A-59-066747 discloses a technique in which, there is added a hardware for discriminating whether or not either a multiplier or a multiplicand is zero before the multiplication is actually executed, so that the processing when the answer becomes zero is speeded up. In the disclosed system, a zero detection circuit is added to an input of a multiplication circuit, so that the zero detection is performed in parallel to the multiplication processing.

In brief, as shown in FIG. 3, a multiplier and a multiplicand supplied from a pair of inputs 302 and 303 are applied to a multiplication circuit 301 and also through a pair of gates 305 and 306 to a zero detection circuit 307, so that a zero flag 308 can be raised without waiting for the result 304 of the multiplication. The multiplication circuit 301 can be controlled by a control circuit 309 on the basis of the zero flag 308.

For the zero discrimination in the entropy coding, it is necessary to discriminate whether or not all of data included in the block (8×8=64 items of data) and in the macro-block (64×6=384 items of data) is zero. In order to execute this processing by use of a general purpose processor, it is necessary to repeat the zero discrimination a number of times corresponding to at least the data amount. 384 repetitions of the zero discrimination will occupy a substantial proportion of the moving picture real time processing. Assuming that the zero discrimination can be performed with only one clock in the 50 MHz general purpose processor, the 384 repetitions of the zero discrimination will occupy 7.6% of the processing time. This cannot be neglected in comparison with other processing, and therefore, should be further speeded up to ensure the real time operation.

In this connection, the above mentioned U.S. Pat. No. 4,823,201 processor was added with no hardware means for executing the zero discrimination processing by a manner other than the above mentioned instruction sequence.

On the other hand, if a hardware for simultaneously executing the zero discrimination of a large amount of data such as 64 words or 384 words at one time, is constructed in accordance with the two-word circuit of Japanese Patent Application Laid-open Publication JP-A-59-066747, the hardware becomes extremely large, and therefore, is not practical.

The zero discrimination has to be performed prior to the entropy coding including the CBP coding and the MBA coding. In this connection, the conception of Japanese Patent Application Laid-open Publication JP-A-59-066747 in which the zero detection and the multiplication processing are executed in parallel to each other, is not suitable for the entropy coding.

SUMMARY OF THE INVENTION

Accordingly, it is an object of the present invention to provide a data processing system which has overcome the above mentioned defects of the conventional systems.

Another object of the present invention is to provide a data processing system capable of executing the block/macro-block skip processing in parallel to the entropy coding, thereby to speed up the whole picture coding processing.

The above find other objects of the present invention are achieved in accordance With the present invention by a data processing system including a data memory means for storing a DCT coefficient data successively transferred one after another, a flag means initialized prior to the successive transfer of the DCT coefficient data, and a non-zero detector for detecting a non-zero data when the DCT coefficient data is successively transferred, the non-zero detector operating to invert a logical condition of the flag means when the non-zero data is detected, so that when the successive transfer of the DCT coefficient data has been completed, whether or not all of the data stored in the data memory means is zero, is confirmed on the basis of the logical condition of the flag means.

Preferably, the data memory means is constituted of a dual-port memory.

According to another aspect of the present invention, there is provided a data processing system for a picture coding processing, comprising a counter means for counting a transfer timing signal, an address translation means for translating a count value outputted from the counter means, into an address, a data memory means receiving the address from the address translation means, for storing a DCT coefficient data successively transferred one after another, in response to the transfer timing signal, a flipflop means initialized prior to the successive transfer of the DCT coefficient data, a non-zero detector for detecting a non-zero data when the DCT coefficient data is successively transferred, the non-zero detector operating to invert a logical condition of the flipflop means when the non-zero data is detected, and an entropy coding processing means coupled to the data memory means and the flipflop means, for confirming on the basis of the logical condition of the flipflop means, whether or not all of the data stored in the data memory means is zero, when the successive transfer of the DCT coefficient data has been completed.

The data processing system can include a DCT quantization operation unit, so that the DCT coefficient data is successively transferred from the DCT quantization operation unit to the data memory means. In addition, the address translation is a zigzag scan translation for the DCT coefficients.

The above and other objects, features and advantages of the present invention will be apparent from the following description of preferred embodiments of the invention with reference to the accompanying drawings.

DESCRIPTION OF THE PREFERRED EMBODIMENTS

Figure 4:
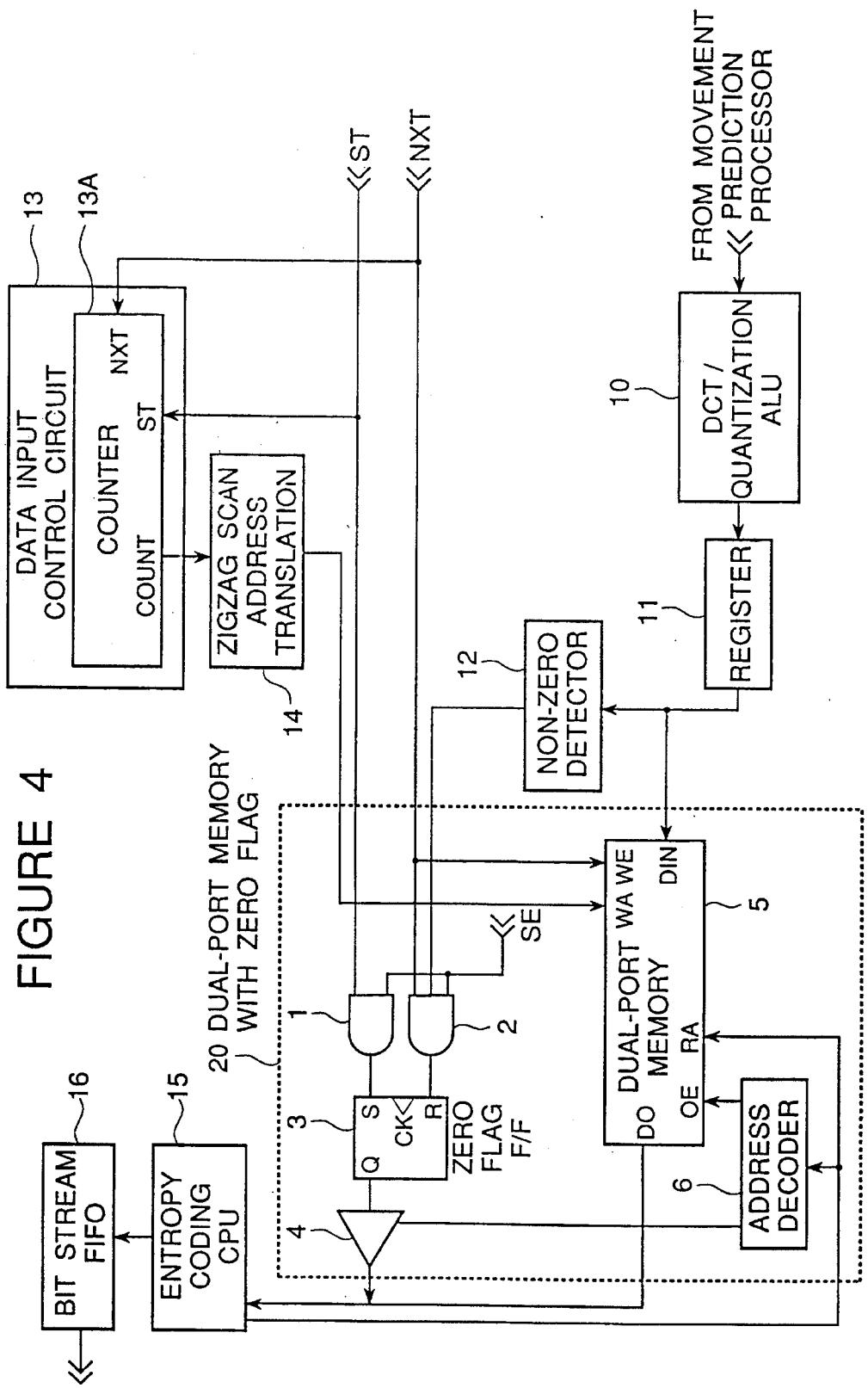
FIG. 4 is a block diagram of a first embodiment of the data processing system in accordance with the present invention for the picture. coding.
Figure 5:
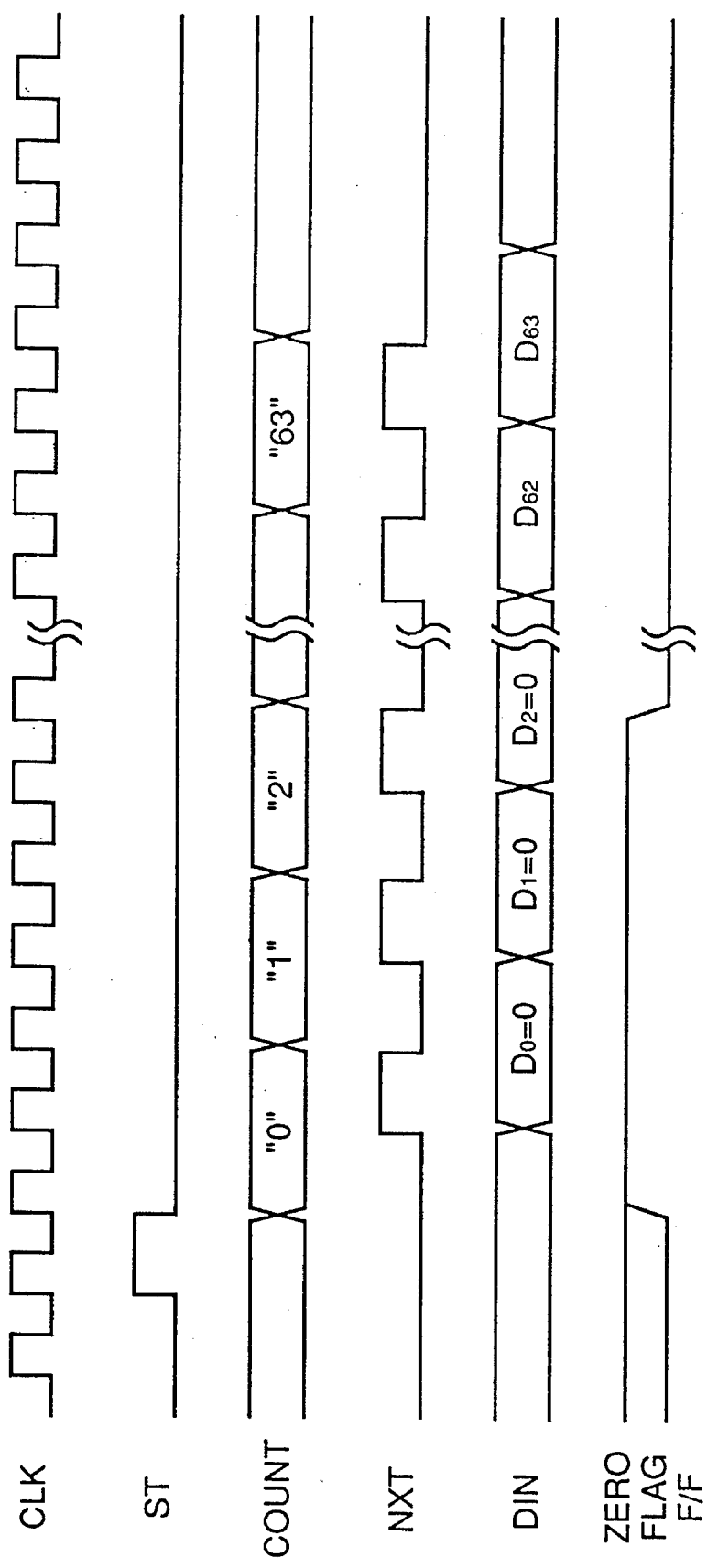
FIG. 5 is a timing chart illustrating an operation of the system shown in FIG. 4.

Referring to FIG. 4, there is shown a block diagram of a first embodiment of the data processing system in accordance with the present invention for the picture coding. FIG. 5 is a timing chart illustrating an operation of the shown system.

Figure 1:
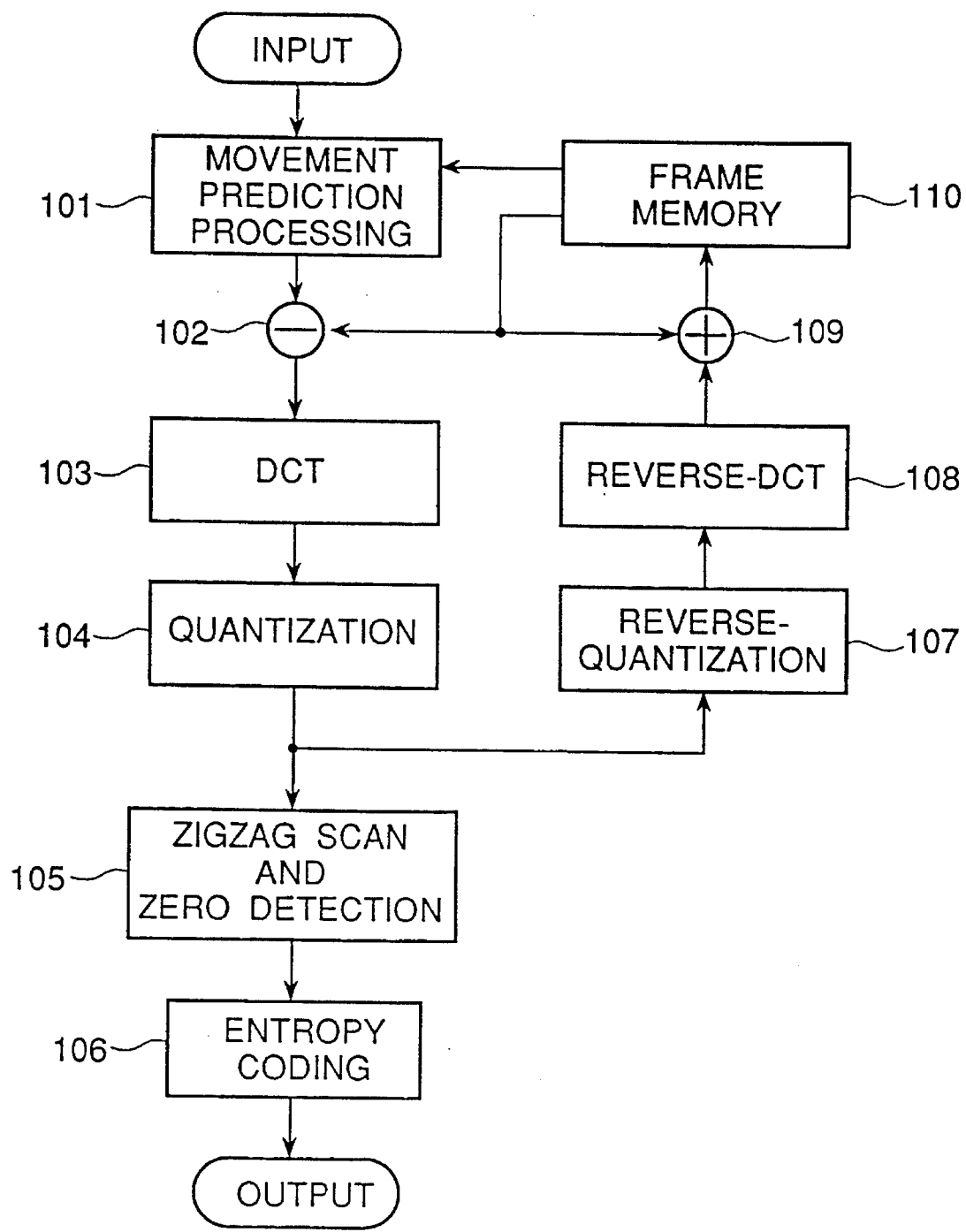
FIG. 1 is a flow chart illustrating the high performance picture coding processing.
Figure 2:
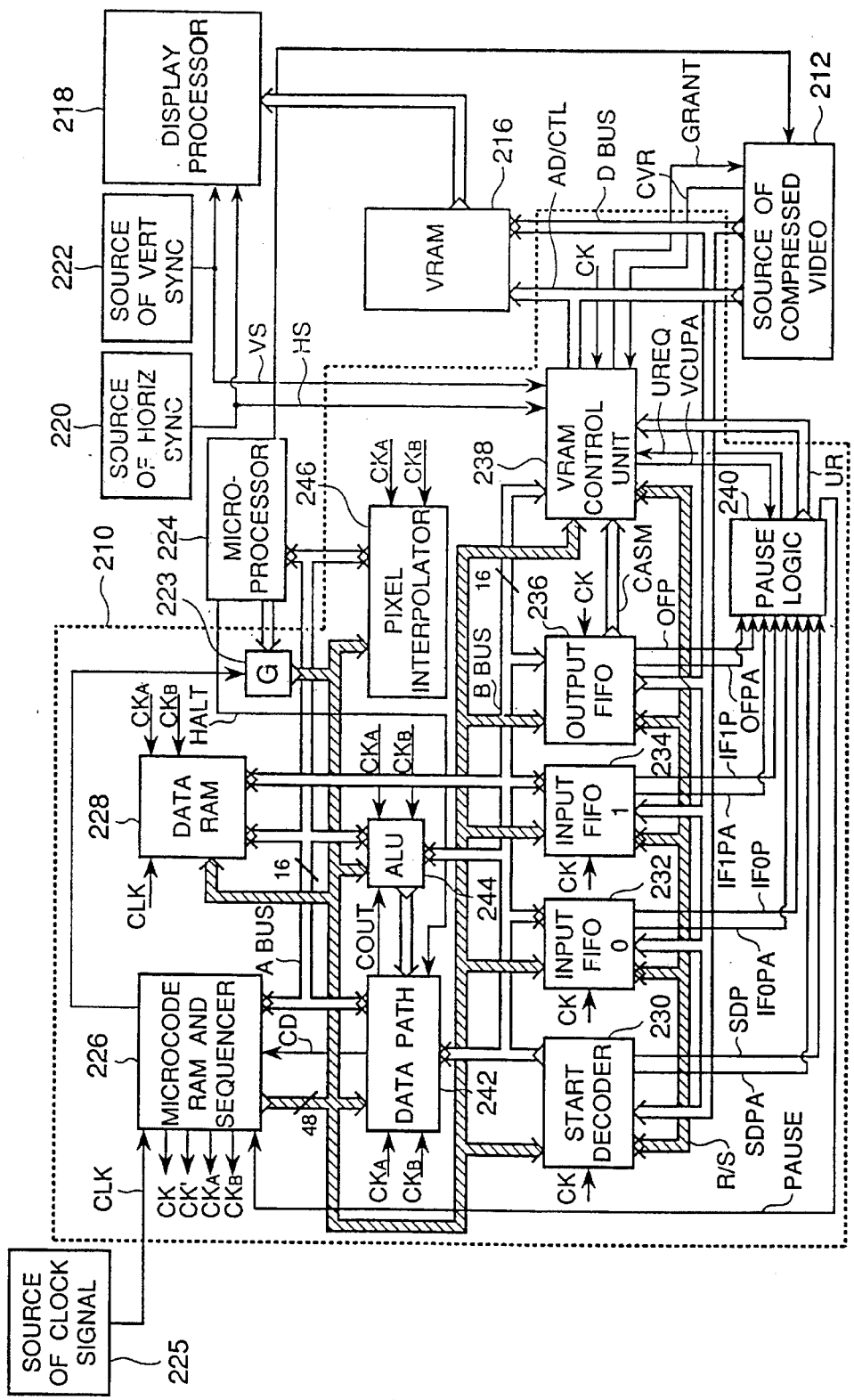
FIG. 2 is a block diagram illustrating one conventional example for realizing a high performance processing.
Figure 3:
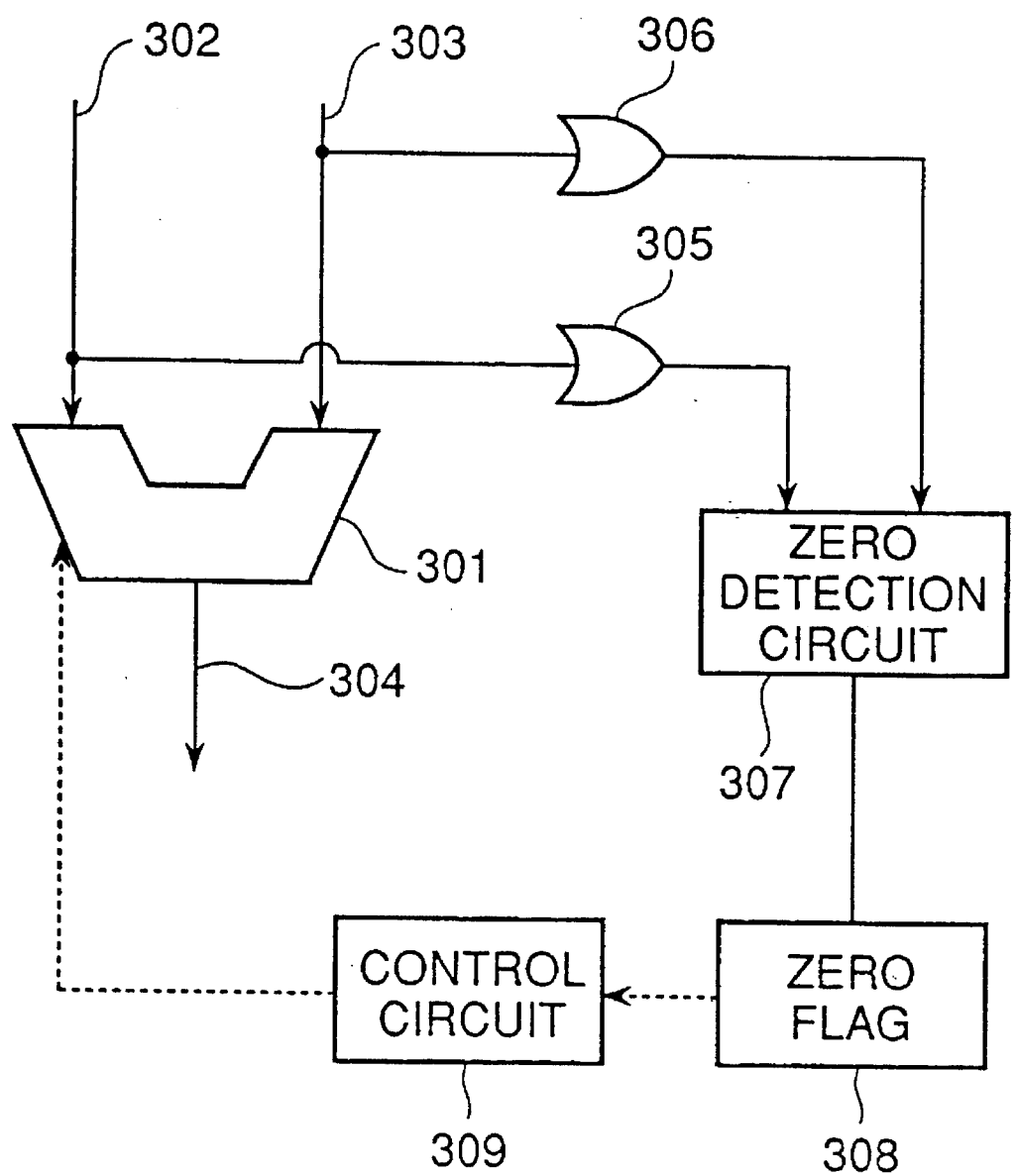
FIG. 3 is a block diagram illustrating another conventional example for realizing a high performance processing.

In the shown embodiment, it is to be understood that the processings upstream of the processing 105 shown in FIG. 1 have been already executed by a DCT/quantization ALU 10 and not shown hardware upstream of the DCT/quantization ALU 10. In addition, the processings upstream of the processing 105 shown in FIG. 1 are well known to persons skilled in the art, and do not have a direct relation to the present invention. Therefore, hardware for the processings upstream of the processing 105 shown in FIG. 1 is omitted in the drawings.

In the shown embodiment, data quantized in the processing 104 shown in FIG. 1 is successively transferred one after another in the order of a raster scanning, from the DCT/quantization ALU 10. The data is temporarily stored in a register 11, and thereafter, is written into a dual-port memory 5.

The timing for writing the data into the dual-port memory 5 is determined by signals ST and NXT. The signal ST is a start signal supplied prior to data transfer of 64 words in the block layer. A set-reset flipflop 3 is set by this signal ST through an AND gate 1, which also receives a system enable signal SE for suppressing controlling of the flipflop 3. When the system enable signal SE is at a logical high level, the AND gate 1 is opened, so that the signal ST passes through the AND gate 1 and is inputted to a set terminal S of the flipflop 3. The signal ST is also applied to a data input control circuit 13 so as to reset a counter 13A included in the data input control circuit 13.

The signal NXT is a timing signal indicating that the data is actually transferred from the DCT/quantization ALU 10. This signal NXT supplied to a write enable input WE of the dual-port memory 5, so that in response to this signal NXT, the, data is actually written into the dual-port memory 5. Also, the counter 13A included in the data input control circuit 13 is incremented in response to each signal NXT, as seen from FIG. 5.

Figure 6:
FIG. 6 illustrates a translation from a raster scan to a zigzag scan.

A count value of the counter 13A included in the data input control circuit 13 is supplied into and translated by a zigzag scan address translation circuit 14 into a write address for the dual-port memory 5. This address translation is performed as illustrated in FIG. 6. For example, if the count value of the counter 13A is "4", the raster scanning order "4" is searched, and then, the zigzag scanning order "7" positionally corresponding to the raster scanning order "4" can be obtained. This zigzag scanning order "7" is supplied to a write address input WA of the memory 5. FIG. 6 illustrates an example of 4×4 matrix, but an actual picture processing is executed in a 8×8 matrix.

A non-zero detector 12 is connected to the register 11 for discriminating whether or not the content of the register 11 is zero. Accordingly, this non-zero detector 12 can be constituted of an OR circuit receiving all bits of the register 11. If all bits of the register 11 are zero, the OR circuit outputs a logical value "0", and if at least one bit of the register 11 is not zero, the OR circuit outputs a logical value "1".

The above mentioned signal NXT is supplied as a reset timing signal to a reset input R of the flipflop 3 through an AND gate 2 which also receives an output of the non-zero detector 12 and the system enable signal SE. Accordingly, when the output of the non-zero detector 12 is at a logical value "1", and when the signal NXT is generated, namely, is brought into a logical value "1", the flipflop 3 constituting a zero flag, is reset.

Thus, when the transfer of 64 items of data (64 words of data) has been completed, the DCT coefficients for one block has been stored in the dual-port memory 5 in the zigzag scanning order. If all the data stored in the memory is zero, an output Q of the flipflop 3 is at a logical value "1". Otherwise, the output Q of the flipflop 3 is a logical value "0".

Completion of the data transfer is notified to an entropy coding CPU 15 through a not-shown-line. The flipflop 3 and the dual-port memory 5 is mapped in a memory space (or an input/output space) of the entropy coding CPU 15, and therefore, can be freely accessed by the entropy coding CPU 15.

Firstly, the entropy coding CPU 15 outputs an address for the flipflop 3, which is decoded by an address decoder 6, which in turn operates to open a tristate buffer 4 connected between the output Q of the flipflop 3 and the entropy coding CPU 15. Therefore, the output Q of the flip flop 3 is read out to the entropy coding CPU 15. If the output Q of the flipflop 3 is at the logical value "1", the entropy coding CPU 15 can discriminate that all of the 64 items of data are zero, with no necessity of reading the dual-port memory 5.

To the contrary, if the output Q of the flipflop 3 is at the logical value "0", the entropy coding CPU 15 outputs an address for reading the dual-port memory 5. The address is supplied to a read address input RA of the dual-port memory 5, and also decoded by the address decoder 6, which outputs a read-out enable signal to an output enable input OE of the dual-port memory 5. Thus, the 64 DCT coefficients are successively read out from a data output DO of the dual-port memory 5 to the entropy coding CPU 15, where the data is subjected to entropy coding processing. A bit stream data subjected to entropy coding processing is stored in a bit stream FIFO 16, and then, outputted from the system.

In the embodiment shown in FIG. 4, for the zero discrimination of an entire block, it is assumed that the size of the dual-port memory is 64 words. For the zero discrimination of the macro-block, it is possible to perform the zero discrimination by repeating the block processing six times. In this case, however, if the data of the dual port memory 5 is not transferred in units of one block to the CPU 15, the content of the dual-port memory 5 will be destroyed by over-writing before the macros:block coding.

Figure 7:
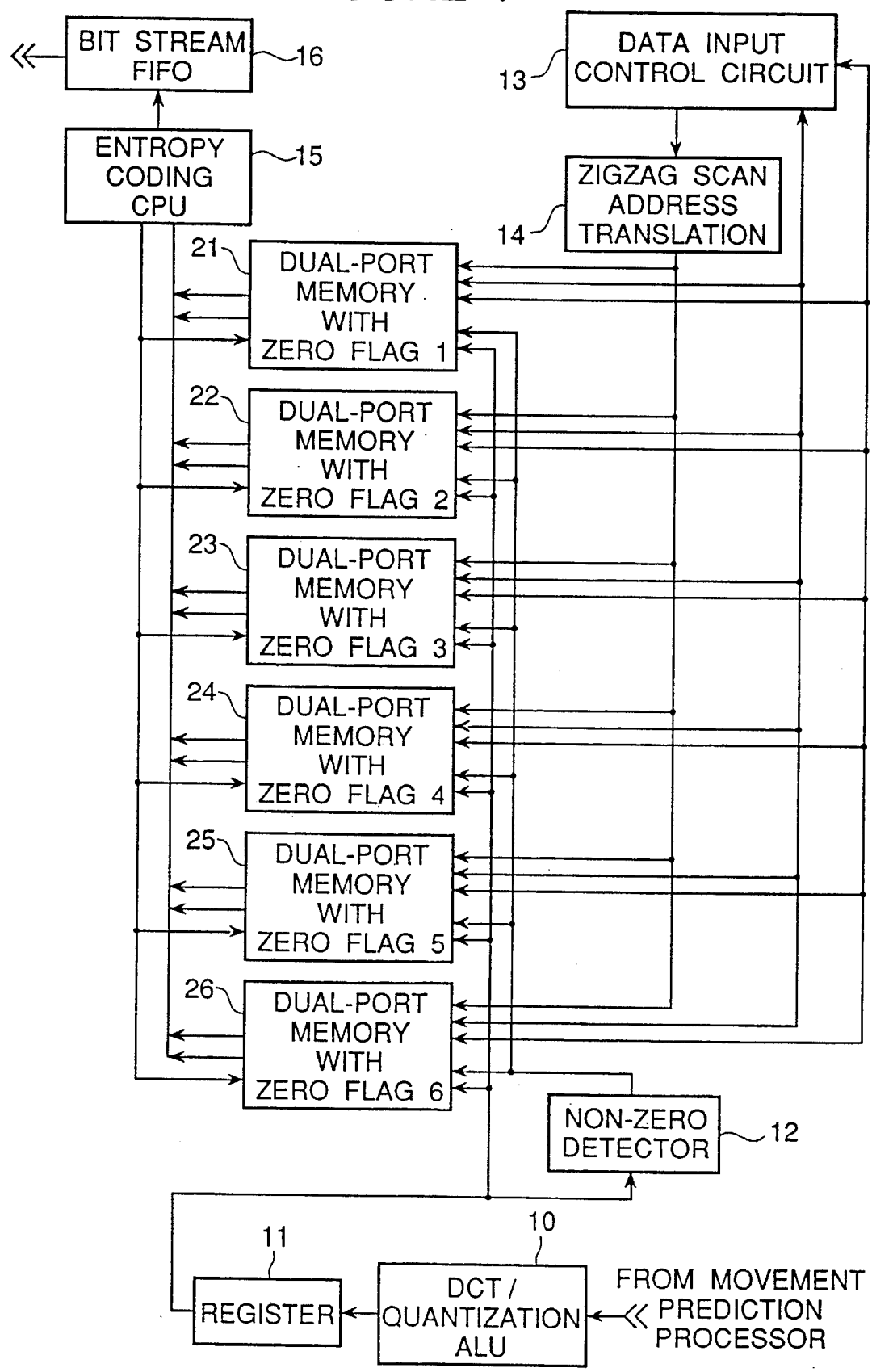
FIG. 7 is a block diagram of a second embodiment of the data processing system in accordance with the present invention for the picture coding.

In order to avoid this inconvenience, as shown in FIG. 7, the system can preferably be modified to have six dual-port memories 21, 22, 23, 24, 25 and 26 with a zero flag memory, which are located in parallel to each other and each of which is the same as a dual-port memory 20 with a zero flag memory, as shown in FIG. 4. In this case, an entire macro-block is stored in the six dual-port memories. Alternatively, it is also possible to provide six zero-flag flipflops 3 and to increase the size of the dual-port memory 5 to six times, for obtaining a similar effect. In both cases, it becomes necessary to add a circuit for selecting the six flipflops 3 controlled by the signals ST and NXT.

Regarding a delay of the processing in the entropy coding CPU 15, several counter measure as in design can be considered. When a block "i" is processed in the entropy coding CPU 15, if a next block "i+1" is written into the dual-port memory in parallel to the processing of the block "i" in the entropy coding CPU 15, the dual-port memory 5 is required to have a margin in the memory capacity corresponding to the overlapped processing. This is also true in the case of the processing in units of macro-block.

As will be apparent from the above, according to the data processing system of the present invention, the skip processing in units of a block or macro-block (coded in a CBP field or in a MBA field of the macro-block layer in the picture coding processing under MPEG or the H.261 recommendation) can be executed independently of the entropy coding processing. In particular, since the skip processing in units of a block or macro-block can be executed in parallel to the entropy coding processing, it is possible to relax the restrictions on the processing time in the real time processing, by about 10%. As a result, since the real time processing can be performed at a low operating frequency, the power consumption may be reduced when the system is constituted of CMOS technology.

The invention has thus been shown and described with reference to the specific embodiments. However, it should be noted that the present invention is in no way limited to the details of the illustrated structures but changes and modifications may be made within the scope of the appended claims.

I claim:

1. A data processing system including:

data memory means for storing discrete cosine transform (DCT) coefficient data successively transferred one after another, said data memory means having a memory capacity which is a multiple of 64 words, flag means initialized prior to the successive transfer of the DCT coefficient data, said flag means including one bit provided for each 64 words, a non-zero detector for detecting a non-zero data when the DCT coefficient data is successively transferred, the non-zero detector operating to invert a logical condition of the flag means when the non-zero data is detected, so that when the successive transfer of the DCT coefficient data has been completed, whether or not all of the data stored in the data memory means is zero, is confirmed on the basis of the logical condition of the flag means, and entropy coding processing means, coupled to the flag means, for discriminating, on the basis of the logical condition of the flag means, whether or not all of the data stored in the data memory means is zero, when the successive transfer of the DCT coefficient data has been completed, said entropy coding processing means performing an entropy coding processing on the basis of a result of the discrimination.

2. A data processing system claimed in claim 1, wherein the data memory means comprises a dual-port memory.

3. A data processing according to claim 1, wherein said non-zero detector comprises an OR circuit for receiving all bits of said DCT coefficient data.

4. A data processing according to claim 1, wherein said flag means comprises a zero flag flip-flop.

5. A data processing according to claim 1 wherein said flag means and said data memory means are mapped into a memory space of the entropy coding processing means.

6. A data processing according to claim 1, wherein a skip processing is executed independently of the entropy coding processing of said entropy coding processing means.

7. A data processing system for a picture coding processing, comprising:

counter means for counting a transfer timing signal, address translation means for translating a count value outputted from the counter means, into an address, data memory means receiving the address from the address translation means, for storing discrete cosine transform (DCT) coefficient data successively transferred one after another, in response to the transfer timing signal, flip-flop means initialized prior to the successive transfer of the DCT coefficient data, a non-zero detector for detecting a non-zero data when the DCT coefficient data is successively transferred, the non-zero detector operating to invert a logical condition of the flip-flop means when the non-zero data is detected, and entropy coding processing means, coupled to the data memory means and the flip-flop means, for confirming, on the basis of the logical condition of the flip-flop means, whether or not all of the data stored in the data memory means is zero, when the successive transfer of the DCT coefficient data has been completed.

8. A data processing system claimed in claim 7, further including a DCT quantization operation unit for successively transferring the DCT coefficient data from the DCT quantization operation unit to the data memory means.

9. A data processing system claimed in claim 8, wherein the address translation comprises a zigzag scan translation for the DCT coefficients.

10. A data processing system claimed in claim 7, wherein the address translation comprises a zigzag scan translation for the DCT coefficients.

11. A data processing according to claim 3, wherein said non-zero detector comprises an OR circuit for receiving all bits of said DCT coefficient data, and wherein said flip-flop means and said data memory means are mapped into a memory space of said entropy coding processing means.

12. A data processing according to claim 3, wherein a skip processing is executed independently of the entropy coding processing of said entropy coding processing means.

13. A data processing system including:

data memory means for storing coefficient data successively transferred one after another, said data memory means having a memory capacity which is a multiple of N words, wherein N is a non-zero integer, flag means initialized prior to the successive transfer of the coefficient data, said flag means including one bit provided for each N words, a non-zero detector for detecting a non-zero data when the coefficient data is successively transferred, the non-zero detector for inverting a logical condition of the flag means when the non-zero data is detected, so that when the successive transfer of the coefficient data has been completed, whether or not all of the data stored in the data memory means is zero, is confirmed on the basis of the logical condition of the flag means, and an entropy coding processor, coupled to the flag means, for discriminating, on the basis of the logical condition of the flag means, whether or not all of the data stored in the data memory means is zero, when the successive transfer of the coefficient data has been completed.

14. A data processing system according to claim 13, wherein said coefficient data is discrete cosine transform (DCT) coefficient data.

15. A data processing system claimed in claim 13, wherein the data memory means comprises a dual-port memory.

16. A data processing system claimed in claim 13, wherein said entropy coding processor performs an entropy coding processing on the basis of a result of the discrimination.

17. A data processing according to claim 13, wherein said non-zero detector comprises an OR circuit for receiving all bits of said coefficient data.

18. A data processing according to claim 13, wherein said flag means comprises a zero flag flip-flop.

19. A data processing according to claim 13, wherein said flag means and said data memory means are mapped into a memory space of the entropy coding processor.

20. A data processing according to claim 13, wherein a skip processing is executed independently of the entropy coding processing of said entropy coding processor.

* * * * *